United States Patent [19]

Rosenberg

[11] Patent Number: 4,661,250

[45] Date of Patent: Apr. 28, 1987

[54] MUTIPLE-DISC FILTER

[76] Inventor: Peretz Rosenberg, Moshav Beit Shearim, Israel

[21] Appl. No.: 779,996

[22] Filed: Sep. 25, 1985

Related U.S. Application Data

[63] Continuation-in-part of Ser. No. 613,351, May 23, 1984, Pat. No. 4,592,839.

[30] Foreign Application Priority Data

| Sep. 7, 1983 | [IL] | Israel | 69679 |
| Oct. 4, 1984 | [IL] | Israel | 73164 |
| Nov. 23, 1984 | [IL] | Israel | 73602 |
| Apr. 2, 1985 | [IL] | Israel | 74786 |

[51] Int. Cl.[4] .................... B01D 25/02; B01D 29/46
[52] U.S. Cl. ............................... 210/352; 210/411; 210/440; 210/444; 210/446; 210/492; 210/498
[58] Field of Search .................. 55/332, 333; 210/345, 210/350, 352, 357, 409, 411, 412, 440, 444, 446–448, 453, 488, 492, 498

[56] References Cited

U.S. PATENT DOCUMENTS

| 1,976,547 | 10/1934 | Dumas | 210/492 X |
| 2,141,436 | 12/1938 | Harris | 210/444 X |
| 2,159,196 | 5/1939 | Babitch | 210/492 X |
| 2,601,521 | 6/1952 | Heftler | 210/444 X |
| 2,847,126 | 8/1958 | Goodman | 210/411 |
| 2,855,106 | 10/1958 | English | 210/488 X |
| 3,397,794 | 8/1968 | Toth et al. | 210/498 X |
| 3,552,552 | 1/1971 | Johnston | 210/447 |
| 4,120,794 | 10/1978 | Taylor | 210/440 X |
| 4,410,430 | 10/1983 | Hagler, Jr. | 210/446 |
| 4,517,089 | 5/1985 | Arnaud | 210/498 X |

FOREIGN PATENT DOCUMENTS

| 233968 | 1/1960 | Australia | 210/492 |
| 669974 | 1/1939 | Fed. Rep. of Germany | 210/444 |
| 334569 | 9/1930 | United Kingdom | 210/492 |
| 1096739 | 12/1967 | United Kingdom | . |
| 2037601 | 7/1980 | United Kingdom | 210/498 |

Primary Examiner—Robert Spitzer
Attorney, Agent, or Firm—Benjamin J. Barish

[57] ABSTRACT

A multiple-disc filter comprises a stack of filtering discs each formed with grooves extending only partially through the thickness of the disc and configured to define a continuous, non-apertured surface on one face and a plurality of spaced ribs projecting from the opposite faces. The ribs are connected together to define a sinuous configuration and have flat line edges. The stack further includes spacing means between the contacting faces of adjacent discs of the stack, spacing the straight line edges of the sinuous ribs of one disc from the face of the next adjacent disc in the stack, such that the contacting faces of adjacent discs define a first group of recesses between the ribs communicating with the housing inlet, a second group of recesses alternating with the first group of recesses and communicating with the housing outlet, and a plurality of filtering passageways between the straight line edges of the ribs and the opposite face of the next adjacent disc.

18 Claims, 24 Drawing Figures

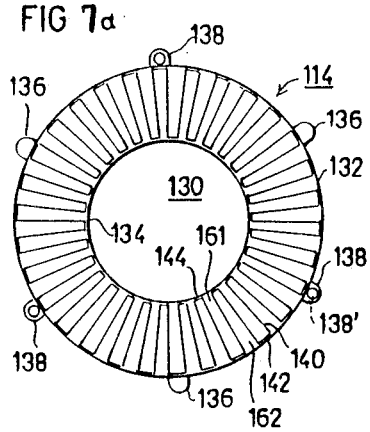
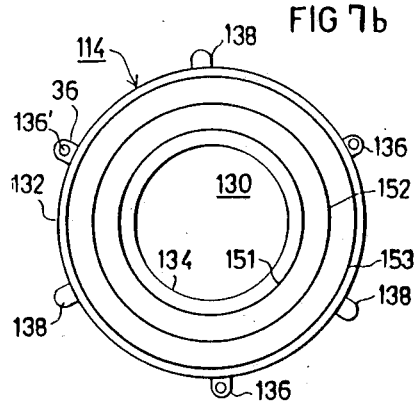
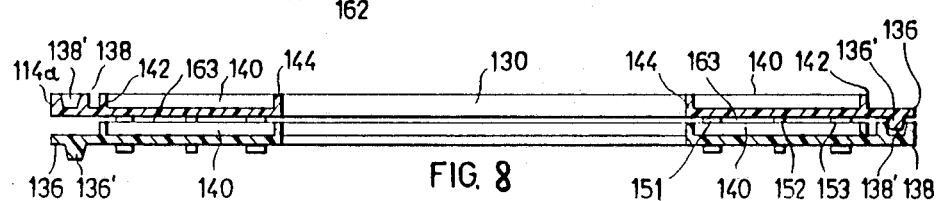
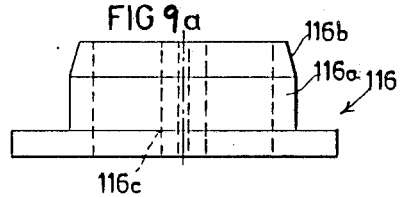
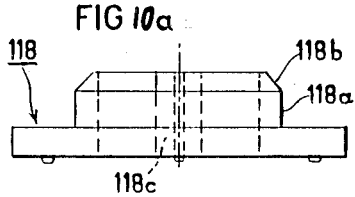
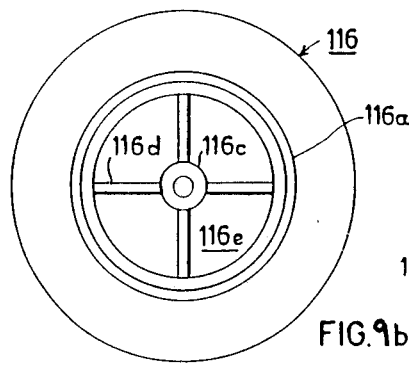
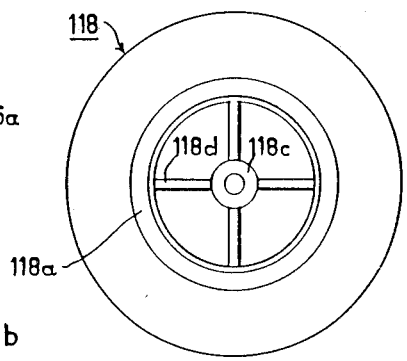

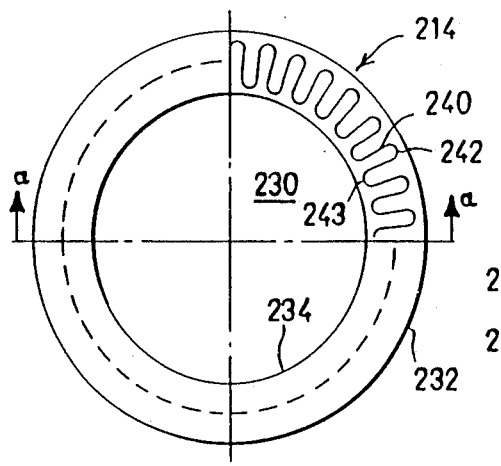
FIG 12.
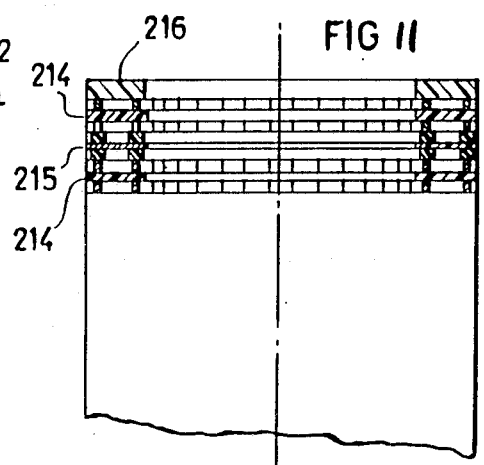
FIG 11
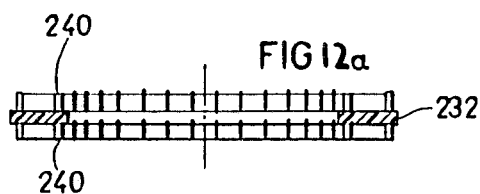
FIG 12a
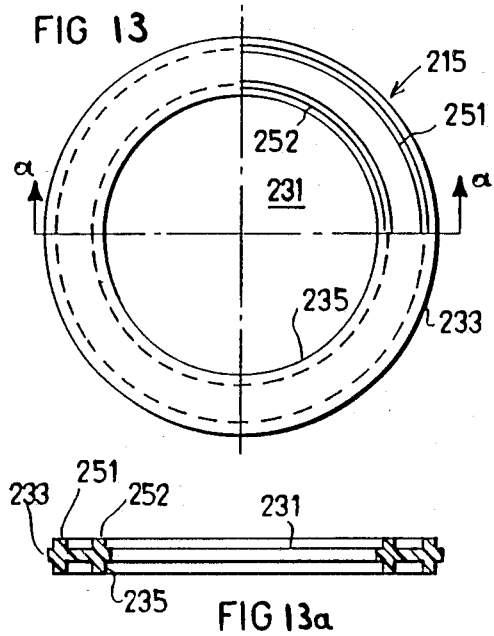
FIG 13
FIG 13a
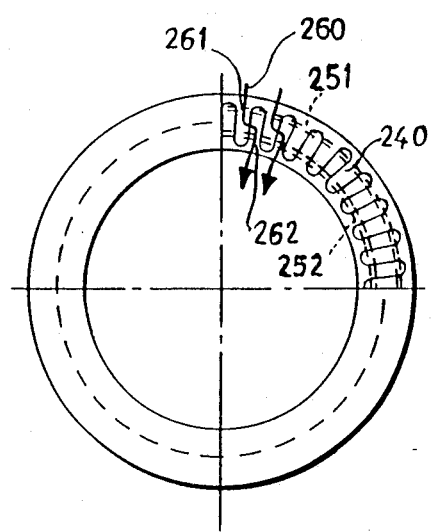
FIG 14

MULTIPLE-DISC FILTER

RELATED APPLICATIONS

The present application is a continuation-in-part of my prior U.S. Pat. application Ser. No. 613,351, filed May 23, 1984, now U.S. Pat. No. 4,592,839, and relates to a multiple-disc filter, and particularly to a disc construction for use in such filters.

BACKGROUND OF THE INVENTION

Multiple-disc filters are gaining increasing use in various applications, for example in water irrigation systems for removing foreign particles which may clog the water irrigation devices. Such filters include a stack of filter discs formed with ribbed side faces such as to form narrow filtering channels between the discs when arranged in a stack. Some of the dirt particles are removed and retained at the upstream face of the filter stack facing the filter inlet, the finer dirt particles entering the spaces between the discs being removed and retained in the narrow filtering channels between the discs.

The main object of the present invention is to provide a filter of this type which has a low sensitivity to clogging by dirt particles, which may be more effectively cleaned in a quick and simple manner and, and which has an increased dirt-removing and dirt-holding capacity, as compared to the conventional filters of this type.

SUMMARY OF THE INVENTION

According to the present invention, there is provided a multiple-disc fluid filter comprising a housing having an inlet and an outlet and a plurality of filter discs included in a stack for filtering the fluid flowing between the discs from the inlet to the outlet, each filter disc being formed with grooves extending only partially through the thickness of the disc and configured to define a continuous, non-apertured surface on one face and a plurality of spaced ribs projecting from the opposite face, with one end of each rib being joined by a bridge to the next adjacent rib at one side thereof, and the opposite end of each rib being joined by a second bridge to the next adjacent rib at the opposite side thereof, so as to define a sinuous configuration. Each of the ribs has a flat outer surface bordered by straight line edges. The stack of discs further includes spacing means between the contacting faces of adjacent discs of the stack, spacing the straight line edges of the ribs of one disc from the face of the next adjacent disc in the stack, such that the contacting faces of adjacent discs define a first group of recesses between the ribs communicating with the inlet, a second group of recesses alternating with the first group of recesses and communicating with the outlet, and a plurality of filtering passageways between the straight line edges of the ribs and the opposite face of the next adjacent discs. The straight line edges block the solid particles in the fluid flowing through the first group of recesses and cause them to accumulate in the first group of recesses.

In one described embodiment, the face of the next adjacent disc in the stack is flat, and the bridges at the two ends of each rib are of greater height than the ribs so as to constitute the spacing means between the contacting faces of adjacent discs, each of the filtering passageways extending continuously for the complete length of its respective rib. In a second described embodiment, the spacing means comprises a plurality of further ribs formed on the contacting face of the next adjacent disc in the stack and extending substantially perpendicular to the first-mentioned ribs. In both of the above-described embodiments, all the discs of the stack may be of identical construction, each disc defining the continuous, non-apertured surface on one face and the plurality of spaced ribs projecting from the opposite face.

However, a further embodiment of the invention is described wherein the stack includes two types of discs alternating with each other in the stack, one type being filter discs formed with the first-mentioned ribs according to the sinuous configuration on both its faces, the other type of filter discs being spacer discs formed with the further ribs on both its faces. Such an arrangement provides a number of additional advantages as will be more particularly described below.

According to a still further described embodiment, all the discs of the stack are apertured and are of tapered configuration forming an angle of 30°–60° with respect to the longitudinal axis of the stack. Such an arrangement provides still further advantages as will also be described below.

BRIEF DESCRIPTION OF THE DRAWINGS

The invention is herein described, by way of example only, with reference to the accompanying drawings, wherein:

FIGS. 7a and 7b are top and bottom plan views, respectively, illustrating the opposite faces of the filter discs in the filter of FIG. 6;

FIG. 8 is an enlarged sectional view illustrating the assembly of two adjacent discs in the filter of FIG. 6;

FIGS. 9a and 9b are side elevational, and top plan views, respectively, illustrating the end disc at one of the stack in the filter of FIG. 6;

FIGS. 10a and 10b are side-elevational, and top plan views, respectively, illustrating the end disc at the opposite end of the stack in the filter of FIG. 6;

FIG. 11 is a sectional view illustrating another filter in accordance with the present invention including a plurality of filter discs alternating with a plurality of spacer discs;

FIG. 12 is a top plan view illustrating the construction of the filter discs in the filter of FIG. 11, FIG. 12a being a section along lines a—a thereof;

FIG. 13 is a plan view illustrating the construction of the spacers discs in the filter of FIG. 11, FIG. 13a being a sectional view along lines a—a of FIG. 13;

FIG. 14 diagrammatically illustrates the filtering passageways formed by the contacting faces of the discs in the filter construction of FIG. 11.

THE EMBODIMENT OF FIGS. 1-5

Figure 1:
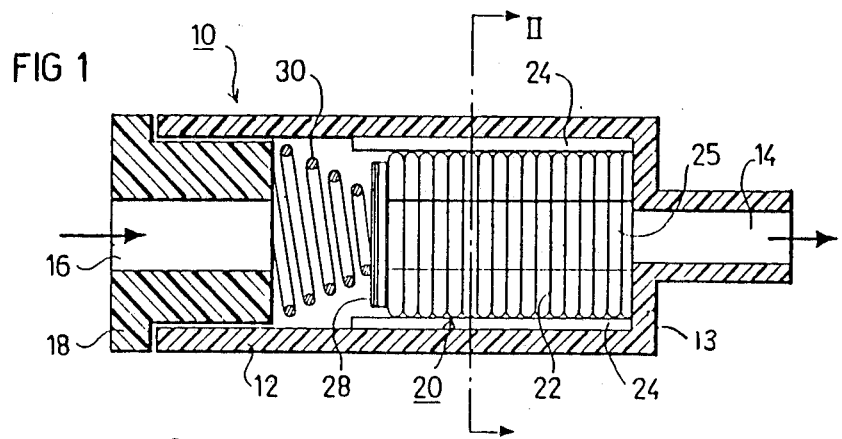
FIG. 1 is a longitudinal sectional view illustrating one form of filter constructed in accordance with the present invention.
Figure 2:
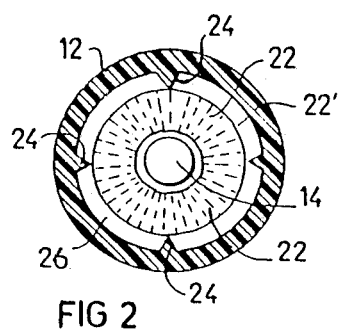
FIG. 2 is a transverse sectional view along lines II—II of FIG. 1.

The filter illustrated in FIGS. 1 and 2 comprises a housing 10 constituted of a main cylindrical section 12 terminating at one end in an end wall 13 formed with the filter outlet 14. The opposite end of cylindrical section 12 is closed by a cap 18 formed with a central aperture 16 serving as the filter inlet.

The filter body, generally designated 20, is disposed within housing 10 and is constituted of a plurality of discs 22 arranged in a stack and spaced from the inner face of the housing cylindrical section 12 by a plurality of axially-extending, circumferentially-spaced ribs 24 formed on the inner face of the housing section. In the construction illustrated in FIGS. 1 and 2, the outer surface of the stack of discs constitutes the upstream surface facing the inlet 16, and the inner surface of the stack constitutes its downstream surface facing the outlet 14. Each filter disc 22 is formed with a central opening 25 communicating with the housing outlet 14, and thereby defining the downstream side of the filter stack. A solid, non-apertured disc 28 is applied to the end of the filter stack 20 facing inlet 16; disc 28 blocks the passageway through opening 25.

It will thus be seen that disc 28 is located within the housing in the path of the inletted fluid upstream of the filter discs 22, such that when the water (or other fluid) is inletted via the inlet 16, it causes disc 28, which acts as a pressure member, to press the filter discs 22 together to tighten the stack. At the same time, disc 28 constrains the water inletted from inlet 16 to flow to the outer face of the stack of filter discs 22, i.e., in the annular space between ribs 24, and then radially inwardly between the dics of the stack to the outlet 14. Pressure disc 28 and the filter discs 22 are urged in the illustrated stacked arrangement by a spring 30 interposed between cap 18 and disc 28 during the normal operation of the filter. Thus, during the normal operation, spring 30 acts with the pressure disc 28 to press the filter discs 22 together to tighten the stack when the water flows from a housing inlet 16 to the housing outlet 14 during the normal filtering operation.

The filter illustrated in FIG. 1 is cleaned by reverse flushing. Thus, when the water supply is connected to the outlet 14 (rather than to the inlet 16), the water is applied to pressure disc 28 since that disc closes the passageway through opening 25. Pressure disc 28 is thus moved against the force of spring 30, thereby permitting the filter discs 22 to move apart to loosen the stack and to permit the water to pass in the reverse direction between their side faces. More particularly, the water flows in the reverse direction from the outlet 14 and through openings 25, causing pressure disc 28 to loosen the stack, then in the radial direction between the filter discs 22 of the stack, and finally out through the filter inlet 16. This reverse flow of the water thereby flushes out the solid particles previously accumulated between the filter discs 22 and also on the upstream (outer) face of the stack.

Figure 3:
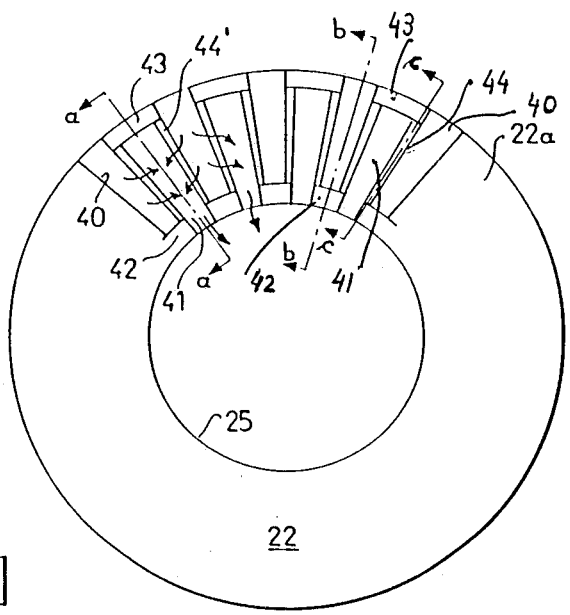
FIG. 3 is an enlarged top plan view illustrating the construction of one of the filter discs in the filter of FIGS. 1 and 2.
Figure 4A:
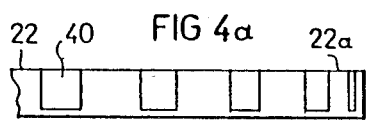
FIGS. 4a and 4b are fragmentary, end-elevational views illustrating the outer and inner ends, respectively, of the filter disc illustrated in FIG. 3.
Figure 4B:
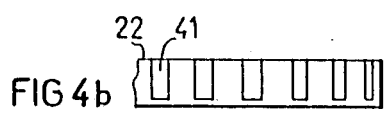
Figure 3A:
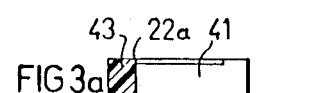
FIGS. 3a, 3b and 3c are sectional views along lines a—a, b—b and c—c, respectively, of FIG. 3.
Figure 3B:
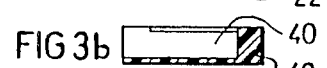
Figure 3C:
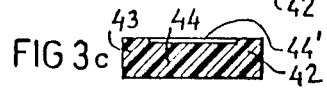

The construction of each of the filtering discs 22 is illustrated in FIG. 3 and the sectional views of FIGS. 3a, 3b, and 3c.

Thus, each filter disc 22 is formed with grooves extending only partially through the thickness of the disc and configured to define a continuous, non-apertured surface on one face 22b, and a plurality of spaced ribs 44 projecting from the opposite face 22a. As shown particularly in FIGS. 3 and 3a-3c, face 22b of each disc is flat, while the ribs 44 projecting from the opposite face 22a of the disc are of sinuous configuration, with each rib being joined to the next adjacent rib by a bridge 42 integral with the ribs at their inner ends, and to the next rib at the opposite side by another bridge 43 integral with the ribs at their outer ends. Both bridges 42 and 43 are slightly higher than ribs 44 (see FIG. 3c) and thereby constitute ridges which project to a greater height than the ribs from face 22a of each disc.

The arrangement is such that the ribbed face 22a of each disc, and the flat face 22b of the next adjacent disc in the stack, define a first group of recesses 40 between the ribs communicating with the housing inlet 16, a second group of recesses 41 between the ribs communicating with the housing outlet 14, and a plurality of filtering passageways 44' (e.g., FIGS. 3, 3c) between the flat faces of ribs 44 in one disc and the flat face 22b of the next adjacent disc. The latter filtering passageways establish communication between recesses 40 and 41 for the complete length of ribs 44.

Each of the ribs 44 has a flat outer face bordered on its opposite sides by line edges. Thus, the filtering passageways 44' are defined by the spaces between the lines edges of the ribs bordering recesses 40 in one disc, and the flat face 22b of the next adjacent disc. The filtering passageways thus are of elongated linear configuration and extend continuously for the complete length of the respective ribs. The solid particles in the water of greater dimension than the filtering passageways 44' are blocked by the line edges of the ribs and accumulate in recesses 40.

The illustrated filter operates as follows:

The water entering the upstream recesses 40 is constrained to flow first in the radial direction through recesses 40, then in the circumferential direction through both of the filtering passageways 44' on opposite sides of each recess 40 to the downstream recesses 41, and then in the radial direction through the latter recesses and out through the outlet 14. The line edges of the ribs 44 bordering the upstream recesses 40, being slightly spaced from the flat face 22b of the next adjacent disc 22 by the projection of ridges 42, 43 past the outer faces of the ribs 44, define the filtering passageways 44' which block any solid particles of a size larger than these passageways and cause the solid particles to accumulate in the upstream recesses 40.

Since each filtering passageway 44' is a continuous linear passageway defined by a line edge (the line edge of ribs 44) and a surface (the flat surface 22b of the next adjacent disc), there is less likelihood of solid particles becoming wedged in this filtering passageway; and if particles do become so wedged, there is less likelihood that they will clog the filter, as compared, for example, to the conventional filter disc construction wherein the filtering passageways are small individual passageways defined by two grooved surfaces.

Moreover, the width of each rib 44 (defining the width of each filtering passageway 44') is a small fraction of the length of the rib, and is also a small fraction of the width of the recesses 40, 41, so that the illustrated construction provides a substantially higher filtering capacity, and a substantially higher dirt-holding capability, than the conventional grooved-disc filters. Further, since the separated solid particles are accumulated in the upstream recesses 40 of large dimension, they can be effectively removed merely by reverse-flushing without disassembling the filter.

During the normal filtering operation, the pressurized water applied to the housing inlet acts with spring 30 against pressure disc 28 to press together and tighten the stack of discs 22, and thereby to force the water to flow through the filtering passageways 44', wherein the solid particles are separated and accumulate in the upstream recesses 40, as described above.

To clean the filter by reverse-flushing, the water supply is connected to the housing outlet 14, rather than the housing inlet 16. The pressure of the water is thus applied to pressure disc 28 against the force of spring 30, which loosens the stack and permits the solid particles accumulated within recesses 40, as well as any solid particles wedged between the discs, to be flushed out through inlet 16.

It will be appreciated that the difference in thickness between bridges 42, 43 and ribs 44 determines the size of the filtering passageways 44', and thereby the size of the particles to be removed from the fluid. These passageways 44' may be made of very shallow depth to produce a fine filtering action, or may be made of greater depth to produce a coarser filtering action.

Figure 5:
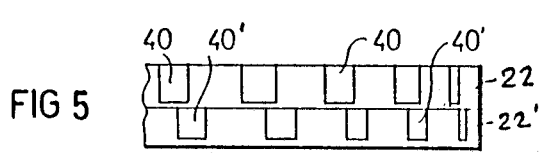
FIG. 5 is a fragmentary end-elevational view illustrating two of the discs in the stack of FIG. 1.

Preferably, the filter discs 22 are stacked with their recesses 40, 41 in non-aligned relationship in adjacent discs of the stack. This is shown by the two discs illustrated in FIG. 5, wherein recesses 40 of disc 22 are non-aligned with respect to recesses 40' of the next adjacent disc 22'. This arrangement is preferred to more uniformly distribute the fluid around the outer circumference of the disc stack as it passes therethrough to the filter outlet 14.

THE EMBODIMENT OF FIGS. 6–10b

Figure 6:
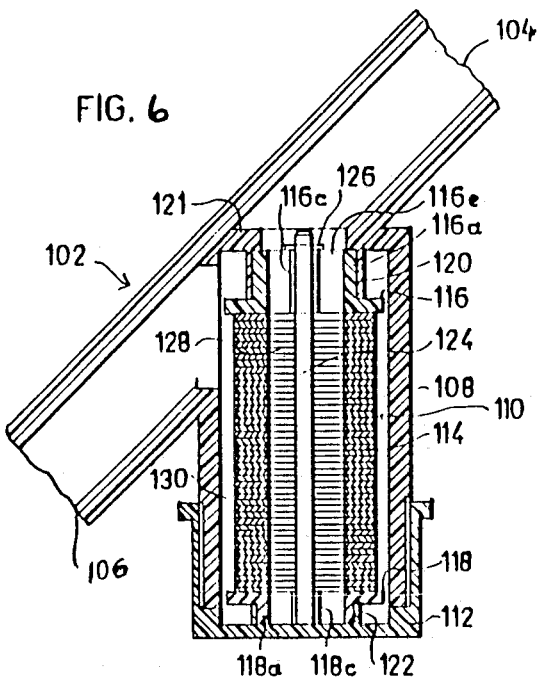
FIG. 6 is a longitudinal sectional view illustrating another form of filter constructed in accordance with the present invention.

The filter illustrated in FIG. 6 comprises a housing, generally designated 102, having an inlet 104 connectable to the upstream water supply pipe, and an outlet 106 connectable to the downstream water supply pipe. Housing 102 further includes an intermediate cylindrical section 108 in which is disposed a filter body, generally designated 110, which removes the solid particles in the irrigating water so that the water flowing via the outlet 106 to the irrigating devices connected to the downstream water supply line will be substantialy free of such particles. Cylindrical housing section 108 is integrally formed at its upper end with the housing inlet 104 and housing outlet 106, and is closed at its bottom by a threaded cap 112.

Filter body 110 is constituted of a stack of filter discs 114 secured between a pair of end discs 116 and 118. End disc 116, more particularly illustrated in FIGS. 9a and 9b, is integrally formed with a central tubular section 116a tapered at its outer tip 116b to facilitate its reception within a sleeve 120 integrally formed in an apertured wall 121 in housing 102. End disc 118, more particularly illustrated in FIGS. 10a and 10b, is also integrally formed with a central tubular section 118a tapered at its outer tip 118b to facilitate its reception within a cylindrical sleeve 122 integrally formed in end cap 112.

Each of the end discs 116, 118, further includes a tubular sleeve 116c, 118c, supported centrally of the respective disc by four radial arms 116d, 118d. A reinforcement rod 124 (e.g. of metal) extends axially through central sleeves 116c, 118c, and the filter discs 114, and firmly secures the discs in a stack as shown in FIG. 6. Rod 124 may be fixed to the end discs 116, 118, in any suitable manner, for example by being threaded at one end into end disc 118, and receiving at its opposite end a threaded nut 126.

The spaces 116e between the radial is ribs 116d in end disc 116 serve as inlet openings for the water. The water is introduced via inlet 104, passes through openings 116e into the inner passageway 128 in filter body 110, radially outwardly through the filter body into the annular passageway 130 between the filter body and the inner face of housing section 108, and out through the outlet 106.

The construction of the filter discs 114 constituting the filter body 110 is more particularly illustrated in FIGS. 7a, 7b and 8. In this embodiment, the spacing means between the contacting faces of adjacent discs, which determines the fineness of the filtering passageways, is defined by a plurality of further ribs formed on the faces of the discs opposite to that of the sinuous ribs and extending substantially perpendicularly to them.

More particularly, each filter disc 114 is of annular configuration, being formed with a large central opening 130 defining an outer circular edge 132 and an inner circular edge 134. Each disc further includes a plurality of tabs 136, 138 projecting from its outer edge. Some tabs 136 are formed with plugs, and other tabs 138 are formed with complementary sockets. In the construction illustrated in FIGS. 7a and 7b, each filter disc 114 includes three tabs 136 formed with plugs 136' projecting from one face of the disc, and three tabs 138 formed with sockets 138' projecting from the opposite face of the disc and spaced between the plug tabs 136, such that a plurality of the discs may be assembled together into the form of a stack by merely inserting the plugs of one disc into the sockets of the next adjacent one as shown in FIG. 8.

FIG. 7a illustrates one face of each filter disc 114, and FIG. 7b illustrates the opposite face.

The face of disc 114 illustrated in FIG. 7a includes a plurality of spaced ribs 140 extending in the radial direction from the outer edge 132 to the inner edge 134 so as to be substantially parallel to each other. The outer end of each rib is joined by a bridge 142 to the next adjacent rib at one side thereof, and the inner end of each rib is joined by a second bridge 144 to the next adjacent rib at the opposite side thereof. Ribs 140 and bridges 142, 144 thus define a continuous simuously-extending rib constituted mostly of sections extending in the radial direction (ribs 140), but having short circumferentially-extending junctures (bridges 144) at the outer and inner edges of the filter disc.

The opposite face of each filter disc 114, as illustrated in FIG. 7b, is formed with three annular ribs 151, 152, 153 coaxially disposed with respect to each other, such that the inner rib 151 is adjacent to the inner edge 134 of the disc, the outer rib 153 is adjacent to the outer edge 132 of the disc, and the intermediate rib 152 is substantially mid-way between ribs 151 and 153.

The discs 114 are assembled together in a stack to form the cylindrical filter body 110 illustrated in FIG. 6 by placing one face (FIG. 7a) of each disc in contact with the opposite face (FIG. 7b) of the next adjacent disc, with the plugs 136' in tabs 136 of one disc 114a (FIG. 8) received within the sockets 138' of the next adjacent disc 114b. It will be seen that when the discs are so assembled, annular ribs 151, 152, 153 extend substantially perpendicularly to the radial ribs 140 of the next adjacent disc.

This arrangement thereby defines the following: a first group of recesses 161 (FIG. 7a) between ribs 140 open at the inner edges 134 of the discs and thereby communicating with the filter inlet via central passageway 128; and a second group of recesses 162, alternating with recesses 161, and open at the outer edges 132 of the discs, and thereby communicating with the filter outlet 106 via the outer annular passageway 130. Communication is established between the two groups of recesses by a plurality of filtering passageways 163 (FIG. 8) between the outer faces of the radial ribs 140 of one disc (114a, FIG. 8) and the annular ribs 151, 152, 153 of the next adjacent disc (114b, FIG. 8).

As seen particularly in FIG. 8, annular ribs 151, 152 and 153 formed on one face of each disc 114 are of smaller height than the radial ribs 140 formed on the opposite face of the disc; thus, the filtering passageways 163 defined by these contacting ribs are of smaller height than recesses 161 and 162 between the radial ribs 14. In addition the thickness of the annular ribs 151, 152 and 153 is very small and their spacing is substantially larger than the spacing between the radial ribs 140; thus, the filtering passageways 163 are substantially longer than their widths and extend for substantially the complete lengths of the radial ribs 140. Ribs 140 are otherwise formed in the same manner as ribs 44 in FIG. 3, i.e., with a flat outer face bordered on its opposite sides by lines edges.

The filter illustrated in FIGS. 6–10b may be used in the following manner;

The filter body 110 is conveniently assembled outside of housing section 108 by merely inserting the plugs 136' of one disc 114 into the sockets 138' of the next adjacent disc until a stack of the desired number of discs is produced. The end discs 116 and 118 are applied to the opposite ends of the stack, and all of the discs are firmly secured together by passing reinforcement rod 124 through central tubs 116c, 118c of the end discs and fixing the opposite ends of the rod thereto. The so assembled stack of filter discs is inserted into cylindrical section 108 of the housing, and end cap 112 of the housing is applied to close the lower end of the housing section.

As a pressurized fluid, e.g. irrigation water, is introduced via the housing inlet 104, the water passes through openings 116e in end disc 116 into the inner passageway 128 of the filter body 110. As described earlier, in the assembled condition of the filter discs 114, annular ribs 151, 152, 153 on one face of each disc firmly contact the radial ribs 140 on the confronting face of the next adjacent disc, to define the plurality of recesses 161 communicating with the inner passageway 128 and thereby with the filter inlet 104, the plurality of recesses 162 communicating with the outer annular passageway 130 and thereby with the outlet 106, and the filtering passageways 163 between the annular ribs 151, 152, 153 and the radial ribs 140.

It will thus be seen that the illustrated filter provides two degrees of filtration, namely coarse filtration defined by the spacing between the radial ribs 140 which block out coarse particles, and fine filtration defined by the height of the annular ribs 151, 152, 153 which block out fine particles. The height of annular ribs, 151, 152, 153 can be varied according to the fine filtration desired. As one example, these ribs may have a height of 0.15 mm which produces approximately a 100-mesh filtration.

It will be particularly noted that the fine particles are removed in the passageways 163 between annular ribs 151, 152, 153, which passageways extend for substantially the complete length of the radial ribs 140. Thus, the illustrated filter has a very high capacity for removing and retaining large quantities of solid particles before cleaning is required. Cleaning may be done by reverse-flushing, or by removing end cap 112 and the stack of filter discs 114, and then rinsing the discs.

THE EMBODIMENT OF FIGS. 11–14

In the previously described embodiments, the filtering discs are all of the same construction, with the sinuous rib being formed on one face of each disc, and the opposite face of each disc either being flat (FIGS. 1–5) or formed with the further ribs (FIGS. 6–10b) to define the spaces producing the filtering passageways between the adjacent discs.

A basic difference in the embodiment of FIGS. 11–14 is that, instead of providing the stack with discs of all the same construction, the stack is provided with two types of discs, one type being filtering dics formed with the sinuous ribs on its opposite faces, and the other type being spacer discs formed with the spacer ribs on its opposite faces and alternating with the first type of discs. Such an arrangement provides a number of important advantages. Thus, the filter discs formed with the sinuous ribs on both faces may be of standardized construction and dimensions for all filter-mesh sizes, the filter-mesh size being determined by the dimensions of the ribs in the spacer discs; that is, the spacer discs would have ribs of larger height to define larger filtering passageways for coarse-mesh filters, and ribs of shorter height to define smaller passageways of fine-mesh filters. This enables considerable savings to be made not only in inventory costs, but also in development, tooling and manufacturing costs. Another advantage in this construction is that the assembling of the filter is much simpler and less prone to mistakes since the disc can be introduced with either face facing outwardly, it only being necessary to alternate the two types of discs when assembling the filter stack. A still further advantage is that the spacer discs may be made of, or may include, special chemical materials, for example carbon to absorb odors and the like.

The filter stack illustrated in FIG. 11 comprises a plurality of filter discs 214 shown in FIGS. 12 and 12a, alternating with a plurality of spacer discs 215 shown in FIGS. 13 and 13a. Both types of discs are of annular configuration, each being formed with a large central opening 230, 231, defining an outer circular edge 232, 233, and an inner circular edge 234, 235.

Disc 214 is formed on both its faces with a sinuous projection or rib 240 progressing completely around the circumference of the disc. FIG. 12 illustrates sinuous rib 240 as occupying only one-fourth of the disc, but it will be appreciated that it is shown thus for simplication purposes and that the sinuous rib actually extends completely around the circumference on both of its faces.

Sinuous rib 240 formed on both faces of disc 214 is constituted of the same construction and configuration as sinuous ribs 140 in the embodiment of FIGS. 6–10b; thus, rib 240 is mostly of straight sections extending radially of the disc; joined by short junctures or bridge sections 242 adjacent to the outer edge of the disc, and by further junctures or bridges 243 adjacent to the inner edge of the disc, to produce the sinuous configuration.

Each of the spacer discs 215, as illustrated in FIGS. 13 and 13a, in formed with but two annular ribs 251, 252, on both of its faces instead of three such ribs as in the embodiment of FIGS. 6–10b. Thus, annular rib 251 is adjacent to the outer edge 233 of the disc, and annular rib 252 is adjacent to its inner edge 235. Although FIG. 13 illustrates ribs 250 extending only for one-fourth the circumference of disc 215, it will be appreciated that these ribs extend for the complete circumference of the disc on both of its opposite faces.

FIG. 11 illustrates the filter stack as including a plurality of filter discs 214 alternating with a plurality of the spacer discs 215, such that the sinuous rib 240 on each of the two faces of disc 214 always contacts the two annular ribs 251, 252 on the confronting face of the spacer discs 215. The plurality of discs are retained in a stack by an end disc 216 at one end of the stack, the opposite end including a similar end disc.

FIG. 14 diagrammatically illustrates the filter passageways formed by the contacting faces of discs 214 and 215 in the stack illustrated in FIG. 11. Assuming the outer face of the stack constitutes the upstream surface, i.e. facing the filter inlet, it will be seen that the flow of the water (or other fluid) through the stack will be as shown by the arrows 260 in FIG. 14. Thus, the contacting faces of the sinuous ribs 240 on discs 214, and the annular ribs 251, 252 on discs 215, will produce a first group of recesses 261 open at the other edges of the discs and thereby communicating with the filter inlet, and a second group of recesses 262, alternating with recesses 261, and open at the inner edges of the discs and thereby communicating with the filter outlet via the central passageway defined by disc openings 230, 231. Communication is established between these two groups of recesses by the plurality of filtering passageways between the radial sections of the sinuous ribs 240 of the filter discs 214, and the annular ribs 251, 252 of the spacer discs 215.

THE EMBODIMENT OF FIG. 15

Figure 15:
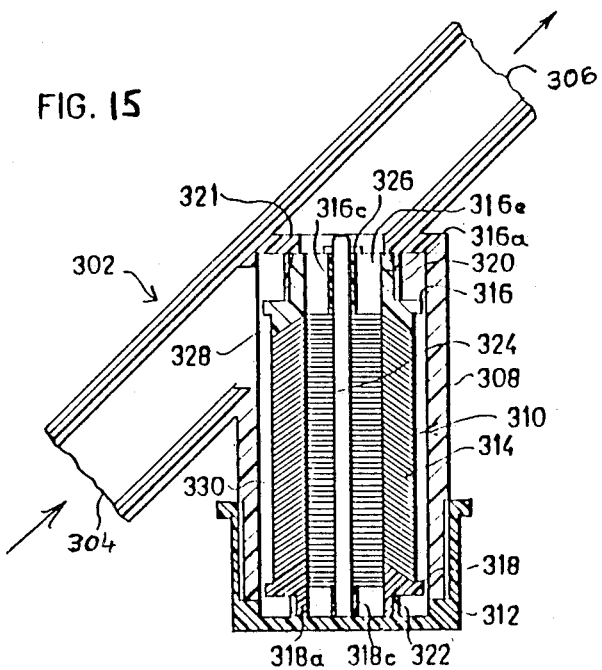
FIG. 15 illustrates a further variation in the construction of a multiple-disc filter in accordance with the present invention.

The filter illustrated in FIG. 15 may be basically of the same overall construction as that in any of the above-described embodiments, except that instead of using discs of planar configuration, the illustrated filter uses discs of tapered configuration, particularly of frusto-conical configuration, which are nestably received within each other.

Thus, the illustrated filter comprises a housing 302 having an inlet 304, an outlet 306, and an intermediate cylindrical section 308 in which is disposed a filter body 310, the bottom of housing section 308 being closed by a threaded cap 312. Filter body 310 is constituted of a stack of filter discs 314 secured between a pair of end discs 316, 318. End disc 316 is integrally formed with a central tubular section 316a, tapered at its outer tip to facilitate its reception within a sleeve 320 integrally formed in an apertured wall 321 in housing 302. End disc 318 is also integrally formed with a central tubular section 318a tapered at its outer top to facilitate its reception within a cylindrical sleeve 322 integrally formed in each cap 312. Each of the end discs 316, 318 further includes a tubular sleeve 316c, 318c, supported centrally of the respective disc by four radial arms defining passageways, e.g. 316c. A reinforcement rod 324 extends axially through sleeves 316c, 318c and the filter discs 314, and firmly secures the discs in a stack. Rod 324 is fixed to end disc 318 and receives a threaded nut 326 at its opposite end for fixing same to disc 316.

In the filter illustrated in FIG. 15, the discs are of tapered configuration from their outer edges to their inner edges and are nestably received within each other. They therefore support each other within the stack. In addition, this configuration of the discs increases the area of the contacting faces between the discs, thereby increasing the filtering capacity for a given size unit.

Further, by disposing the stack of discs in a vertical position as illustrated in FIG. 15, with the inlet edges of the contacting surfaces of the discs below their outlet edges, the coarse dirt particles in the fluid separated at the inlet edges of the discs tend to fall to the bottom of the housing. In the illustrated arrangement, the outer edges of the discs 314 are at the inlet side of the stack 310 and are therefore lower than the inner edges of the discs, constituting the outlet side of the stack. Accordingly, the coarse dirt particles will tend to fall by gravity on top of the threaded cap, and therefore may be conveniently removed by merely removing the cap, or by providing a dirt purging outlet through the cap.

Preferably, the filter discs 314 are of frusto-conical configuration forming an angle of 30°–60° with respect to the longitudinal axis of the stack 310. A preferred angle is 45°. The two end discs 316 and 318 are preferably also of the same frusto-conical configuration.

The contacting faces of the discs are formed with ribs and recesses of any desired configuration, such as in the above-described embodiments, in order to provide the proper filtering passageways for the fluid flowing from the housing inlet 304 to the housing outlet 306. Preferably, the discs are constructed of flexible material to enable them to flex and close any gaps between their contacting faces when tigthened by nut 326, in order to preclude channeling of the fluid because of dimensional imprecisions.

I claim:

1. A multiple-disc fluid filter comprising:
   a housing having an inlet and an outlet and a plurality of filtering discs included in a stack for filtering the fluid flowing between the discs form said inlet to said outlet,
   each filtering disc being formed with grooves extending only partially through the thickness of the disc and configured to define a continuous, non-apertured surface on one face and a plurality of spaced ribs each having a thin, substantially-linear outer surface bordered by a line edge projecting at a uniform unchanging height throughout its length from the opposite face, with one end of each rib being joined by a bridge to the next adjacent rib at one side thereof, and the opposite end of each rib being joined by a second bridge to the next adjacent rib at the opposite side thereof;
   said stack of discs further including spacing means between the contacting faces of adjacent discs of the stack, spacing the line edges in the outer surfaces of said ribs of one disc from the face of the next adjacent disc in the stack, such that the contacting faces of adjacent discs define a first group of recesses between said ribs communicating with said inlet, a second group of recesses alternating with said first group of recesses and communicating with said outlet, and a plurality of filtering passageways between the line edges of said ribs and said opposite faces of the next adjacent disc, which line edges block the solid particles in the fluid flowing through said first group of recesses and cause them to accumulate in said first group of recesses.

2. The filter according to claim 1, wherein the width of each rib is a small fraction of its length, and also a small fraction of the width of the recesses between ribs.

3. The filter according to claim 1, wherein said face of the next adjacent disc in the stack is flat, said bridges at the two ends of each rib being of greater height than said ribs so as to constitute said spacing means between the contacting faces of adjacent discs, each of said filtering passageways extending continuously for the complete length of its respective rib.

4. The filter according to claim 1, wherein said spacing means comprises a plurality of further ribs formed on the contacting face of said next adjacent disc in the stack and extending substantially perpendicularly to said first-mentioned ribs.

5. The filter according to claim 4, wherein said further ribs are of substantially smaller height than said filter-mentioned ribs such that said filtering passageways are of substantially smaller height than the height of said first and second recesses.

6. The filter according to claim 4, wherein said further ribs are spaced from each other a substantially larger distance than the spacing of said first-mentioned ribs from each other such that the length of each of said filtering passageways is substantially longer than its width.

7. The filter according to claim 4, wherein said discs and said further ribs thereon are both of annular shape, said first-mentioned ribs extending in the radial direction of the respective disc, and said bridges extending in the circumferential direction of the respective disc.

8. The filter according to claim 4, wherein all said discs of the stack are of identical construction, each disc defining said continuous, non-apertured surface on one face and said plurality of spaced ribs projecting from said opposite face.

9. The filter according to claim 4, wherein said stack includes two types of discs alternating with each other in the stack, one type being filter discs formed with said first-mentioned ribs according to a sinuous configuration on both its faces, the other type being spacer discs formed with said further ribs on both its faces.

10. The filter according to claim 9, wherein all said discs are of annular shape, said sinuous ribs formed on the faces of said filter discs including straight sections extending radially of the respective disc, said further ribs formed on said spacer discs being of annular shape and extending circumferentially of the respective disc.

11. A multiple-disc filter including a plurality of discs arranged in a stack and having contacting faces between adjacent discs formed with ribs to define filtering passageways therebetween, one of said contacting faces being formed with a sinuous rib constituted of straight sections extending in one direction joined at opposite ends by bridge sections, the other contacting face of adjacent discs being formed with further ribs extending in substantially parallel, spaced relationship to each other and perpendicularly to said straight sections of the sinuous ribs; and stack including two types of discs alternating with each other in the stack, one type being filter discs formed with said sinuous ribs on both its faces, the other type being spacer discs formed with said further ribs on both its faces.

12. The filter according to claim 11, wherein all said discs are of annular shape, said straight sections of the sinuous ribs formed on both faces of alternating discs extending radially of the respective discs, said further ribs formed in spaced, parallel relationship on both faces of said spacer discs being of annular shape and extending circumferentially of the respective disc.

13. A filter disc for use in a multiple-disc filter having an inlet and an outlet; said filter disc being formed with grooves extending only partially through the thickness of the disc and configured to define a continuous, non-apertured surface on one face and a plurality of spaced ribs having thin, substantially-linear outer surfaces bordered by line edges projecting at a uniform unchanging height throughout their lengths from the opposite face, with one end of each rib being joined by a bridge to the next adjacent rib at one side thereof, and the opposite end of each rib being joined by a second bridge to the next adjacent rib at the opposite side thereof, such that said ribs form with said bridges a sinuous configuration defining a first group of recesses for communication with the filter inlet alternating with a second group of recesses for communication with the filter outlet.

14. The filter disc according to claim 13, wherein the width of each rib is a small fraction of its length, and also a small fraction of the width and length of the recesseses between ribs.

15. The filter disc according to claim 13, wherein the bridges at the two ends of each rib are of greater height than said ribs such that when a plurality of said discs are assembled as a stack in the filter, said bridges of one disc engage the continuous non-apertured surface of the next disc of the stack so as to define filtering passageways between the thin outer surface of the ribs of one disc and the continuous non-apertured surface of the next disc of the stack.

16. The filter disc according to claim 13, wherein the continuous non-apertured surface on said one face of the disc is formed with a plurality of spaced ribs extending substantially perpendicularly to said ribs of sinuous configuration projecting from its opposite face, such that when a plurality of said discs are assembled as a stack in the filter, said plurality of spaced ribs formed on said one face of the disc contact said ribs of sinuous configuration projecting from the opposite face of the next adjacent disc to define filtering passageways between the discs.

17. The filter disc according to claim 16, wherein the disc is of annular configuration and is formed with a central opening therethrough, said ribs formed in said one face of the disc also being of annular configuration and spaced radially from each other; said ribs projecting from said opposite face of the disc extending radially thereof.

18. The filter disc according to claim 13, wherein said one face of the disc is formed with ribs of the same configuration as said ribs projecting from said opposite face of the disc, such that a plurality of said discs may be assembled together in a filter with each disc spaced from the next one by a spacer disc.

* * * * *

UNITED STATES PATENT AND TRADEMARK OFFICE
CERTIFICATE OF CORRECTION

PATENT NO. : 4,661,250                    Page 1 of 2
DATED      : April 28, 1987
INVENTOR(S): Peretz Rosenberg It is certified that error appears in the above-identified patent and that said Letters Patent is hereby corrected as shown below:

Column 1, line 27, delete "and" (first appearance).
Column 1, line 57, change "discs" to --disc--.
Column 2, line 3, change "perpendicular" to --perpendicularly--.
Column 3, line 40, change "dics" to --discs--.
Column 4, line 29, change "lines" to --line--.
Column 6, line 52, change "144" to --142,144--.
Column 7, line 22, change "14" to --140--.
Column 7, line 30, change "lines" to --line--.
Column 7, line 30, following the period add --Ribs 140 are otherwise formed in the same manner as ribs 44 in Fig. 3, i.e., with a flat outer face bordered on its opposite sides by line edges--.
Column 8, line 64, cancel "constituted".
Column 8, line 66, before "mostly" insert --constituted--.

Signed and Sealed this

Fifteenth Day of November, 1988

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,661,250
DATED : April 28, 1987
INVENTOR(S) : Peretz Rosenberg

It is certified that error appears in the above-identified patent and that said Letters Patent is hereby corrected as shown below:

Column 9, line 63, change "each" to --end--.

Column 11, line 20, change "filter-mentioned" to --first-mentioned--.